(12) United States Patent
Hsu

(10) Patent No.: US 7,991,818 B2
(45) Date of Patent: Aug. 2, 2011

(54) DIVISION UNIT, IMAGE ANALYSIS UNIT AND DISPLAY APPARATUS USING THE SAME

(75) Inventor: Tien-Chu Hsu, Kaohsiung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/844,848

(22) Filed: Jul. 28, 2010

(65) Prior Publication Data

US 2010/0289837 A1 Nov. 18, 2010

Related U.S. Application Data

(62) Division of application No. 11/425,695, filed on Jun. 21, 2006, now abandoned.

(51) Int. Cl.
*G06F 7/52* (2006.01)
(52) U.S. Cl. ........................................................ 708/650
(58) Field of Classification Search ................... 708/650
See application file for complete search history.

(56) References Cited

U.S. PATENT DOCUMENTS

| 5,740,344 | A  | * | 4/1998 | Lin et al. ...................... 345/587 |
| 6,999,981 | B2 | * | 2/2006 | Goel et al. ................... 708/201 |
| 7,095,906 | B2 | * | 8/2006 | Gu ................................ 382/284 |

* cited by examiner

*Primary Examiner* — Tan V Mai
(74) *Attorney, Agent, or Firm* — Jianq Chyun IP Office

(57) ABSTRACT

A division unit, an image analysis unit and a display apparatus using the same capable of simplifying the computation of overall average gray scale are provided. The division unit includes an adder for receiving a first to an $N^{th}$ bus signals to produce an addition result, wherein the first to the $N^{th}$ bus signals shift the input signal by a different number of bits and adding logic zeros to the shifted bits as compensation, where N is a positive whole number, and a multiplexer for receiving a most significant bit (MSB) of the addition result, wherein, when the MSB has a first value, the multiplexer treats P bits of the addition result as a division result, and when the MSB has a second value, the multiplexer outputs P logic 1 to serve as the division result, where P is a positive whole number.

8 Claims, 4 Drawing Sheets

DIVISION UNIT, IMAGE ANALYSIS UNIT AND DISPLAY APPARATUS USING THE SAME

CROSS-REFERENCE TO RELATED APPLICATION

This application is a divisional application of and claims the priority benefit of an U.S. application Ser. No. 11/425,695, filed on Jun. 21, 2006, now pending. The entirety of the above-mentioned patent application is hereby incorporated by reference herein and made a part of this specification.

BACKGROUND OF THE INVENTION

1. Field of the Invention

The present invention relates to a division unit, an image analysis unit and a display apparatus using the same. More particularly, the present invention relates to a division unit, an image analysis unit and a display apparatus using the same capable of simplifying the computation of overall average gray scale.

2. Description of Related Art

Display apparatus including the liquid crystal monitor, the liquid crystal television and the plasma television have played an important role in our modern-day life.

Due to intrinsic defects in a display panel (for example, a liquid crystal display panel), an image analysis at the system end is often required to compensate these defects. In an image analysis, a large number of mathematical computations are performed to obtain an overall average gray scale value of the image. The overall average gray scale value thus obtained can be used, for example, to adjust the contrast or the dynamic backlight. Using a scanning frequency of 60 Hz as an example, a total of 60 frames are scanned every second. However, to improve the image quality, it is preferable to obtain an overall average gray scale value of the image between two consecutive scanning operations for adjusting the contrast or the dynamic backlight.

The overall average gray scale value of an image is defined as follows:

$$(AVG\_R + AVG\_G + AVG\_B)/3 = AVG\_L \quad (1)$$

where AVG_R represents the average gray scale value of all red pixels, AVG_G represents the average gray scale value of all green pixels, AVG_B represents the average gray scale value of all blue pixels, and AVG_L is the overall average gray scale value. In turn, AVG_R, AVG_G and AVG_B are defined as follows:

$$AVG\_R = TOTAL\_R/RES \quad (2)$$

$$AVG\_G = TOTAL\_G/RES \quad (3)$$

$$AVG\_B = TOTAL\_B/RES \quad (4)$$

where RES represents the resolution of the display panel (using a resolution of 800*480 as an example in the following description), TOTAL_R represents the sum of all the gray scale signals of the red pixels, TOTAL_G represents the sum of all the gray scale signals of the green pixels, and TOTAL_B represents the total of all the gray scale signals of the blue pixels. Putting formulas (2) to (4) into formula (1), the following equation is obtained:

$$AVG\_L = (TOTAL\_R + TOTAL\_G + TOTAL\_B)/ \quad (5)$$

$$(800*480*3)$$

$$= TOTAL\_L/1152000,$$

where TOTAL_L represents the total of all the gray scale signals of the image.

When an image is input, accumulating all the gray scale signals of this image will produce the total of the gray scale signals, hereinafter referred as a totaled gray scale signal TOTAL_L. In other words, a simple cumulative circuit can be used to obtain the totaled gray scale signals. In general, the totaled gray scale signal TOTAL_L is a variable that changes according to the input image. In formula (5), the denominator is a fixed value because the resolution of the finished display panel is fixed. At present, there are a few conventional techniques for implementing the division to obtain the overall average gray scale value of the image, which are respectively explained in the following.

The first conventional technique is to use a dedicated application specific integrated circuit (ASIC) to perform the division. However, an extra IC chip is needed so that additional cost and additional circuit area are required.

The second conventional technique is to custom design a division computational circuit such as a special divider or a look-up table scheme. In the following, a divider and a look-up table scheme are introduced respectively.

A typical divider is designed as a shift divider whose algorithmic flow is shown in FIG. 1. First, in step S11, parameters A, M, M, Q and Count are initialized. Here, the parameter A represents the remainder whose initial value is 0. M is the divisor and it has a value 3 (whose binary value is 0011), for example. Q is the dividend, but ultimately, it also represents the quotient (that is, the answer). The value of Q is 7 (whose binary value is 0111), for example. Count represents a bit parameter.

In step S12, the parameters A and Q are shifted to the left by one bit. In step S13, set A=A−M. In step S14, the value of A is checked to determine if it is smaller than 0. If the value of A is not smaller than 0, then set Q0=1, where Q0 represents the lowest bit of the parameter Q as shown in step S15. However, if A is smaller than 0, then set Q0=0 and A=A+M as shown in step S16.

Then, set Count=Count−1 as shown in step S17. Then, the renewed parameter Count is checked to determine if it is 0 as shown in step S18. If the parameter Count is not 0, then the flow returns to step S12. However, if the parameter Count is 0, it means the remainder A and the quotient Q have already been found as shown in step S19.

In the design of a common micro-controller, a 4-bit division computation requires 13 steps. In other words, the computation requires 13 clock cycles to complete. Therefore, if the digital circuit is designed according to shift division and integrating some of the steps within a single clock cycle, the 4-bit division still requires at least 4 clock cycles.

Using a resolution of 800*480 as an example, the maximum possible value of the total gray scale values (using an 8-bit gray scale signal as an example) of the image is 800*480*3*255=293,760,000 so that the number of bits is $\log_2 293,760,000 = 28.13 \approx 29$. Therefore, if a shift division method is used to compute the average gray scale value, a total of at least 29 clock cycles is required to finish the job, which is quite time-consuming.

In the table look-up method, the dividend is separated into a plurality of groups each having an identical number of bits.

Then, through a look-up method, a plurality of quotient groups is found. Thereafter, the bits are regrouped together to give the correct answer. FIG. 2 is a division circuit that uses a look-up table. As shown in FIG. 2, the look-up tables (LUT) 21 to 23 are used for finding a number of corresponding quotient groups and the shift units 24 to 26 are used for shifting the results obtained from the LUT 21 to 23. Finally, the adder 27 sums up the results of the shift units 24 to 26 to form a quotient. In the example shown in FIG. 2, the dividend has 29 bits and the quotient has 8 bits.

Although the divider occupies a smaller circuit area, it requires more clock cycles to obtain the same computational result so that the efficiency of the image analysis is cut back. On the other hand, although the look-up table method is fast to obtain the computational result, it demands more memory and hence has to occupy more circuit area.

Therefore, it is preferable to have a division unit, an image analysis unit and a display apparatus using the same that use a simpler computational method to speed up the finding of overall average gray scale value without occupying too much circuit area.

SUMMARY OF THE INVENTION

Accordingly, at least one objective of the present invention is to provide a division unit, an image analysis unit and a display apparatus using the same capable of simplifying the computation of overall average gray scale value. The overall average gray scale value of an image is obtained through a combinatorial circuit comprising a shift adder and a multiplexer.

At least another objective of the present invention is to provide a division unit, an image analysis unit and a display apparatus using the same capable of simplifying the computation of overall average gray scale value and avoiding noise interference so that error overflow can be prevented.

To achieve these and other advantages and in accordance with the purpose of the invention, as embodied and broadly described herein, the invention provides a division unit based on shift adding capable of dividing an input signal to produce a division result. The division unit includes a plurality of shift units for shifting the different bits of the input signal for generating shifted results, an adder for totaling the shifted results from the shift units and producing an addition result, and a most-significant-bit (MSB) shift unit for extracting the MSB (containing a plurality of bits) of the addition result to serve as a division result.

The present invention also provides an alternative division unit based on shift adding capable of dividing an input signal to produce a division result. The division unit includes an adder for totaling a plurality of line signals produced by shifting the different bits of the input signal to generate an addition result, and a multiplexer for receiving the addition result. When the most significant bit (MSB) of the addition result has a logic '0' (that is, no overflow), the multiplexer treats the plurality of bits in the addition result as a division result. When the most significant bit (MSB) of the addition result is a logic '1' (that is, with an overflow), the multiplexer outputs a plurality of logic '1's to serve as the division result.

Since the present invention provides a division unit based on shift adding, a division result can be computed within a very short time. Furthermore, the division unit occupies very little circuit area.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
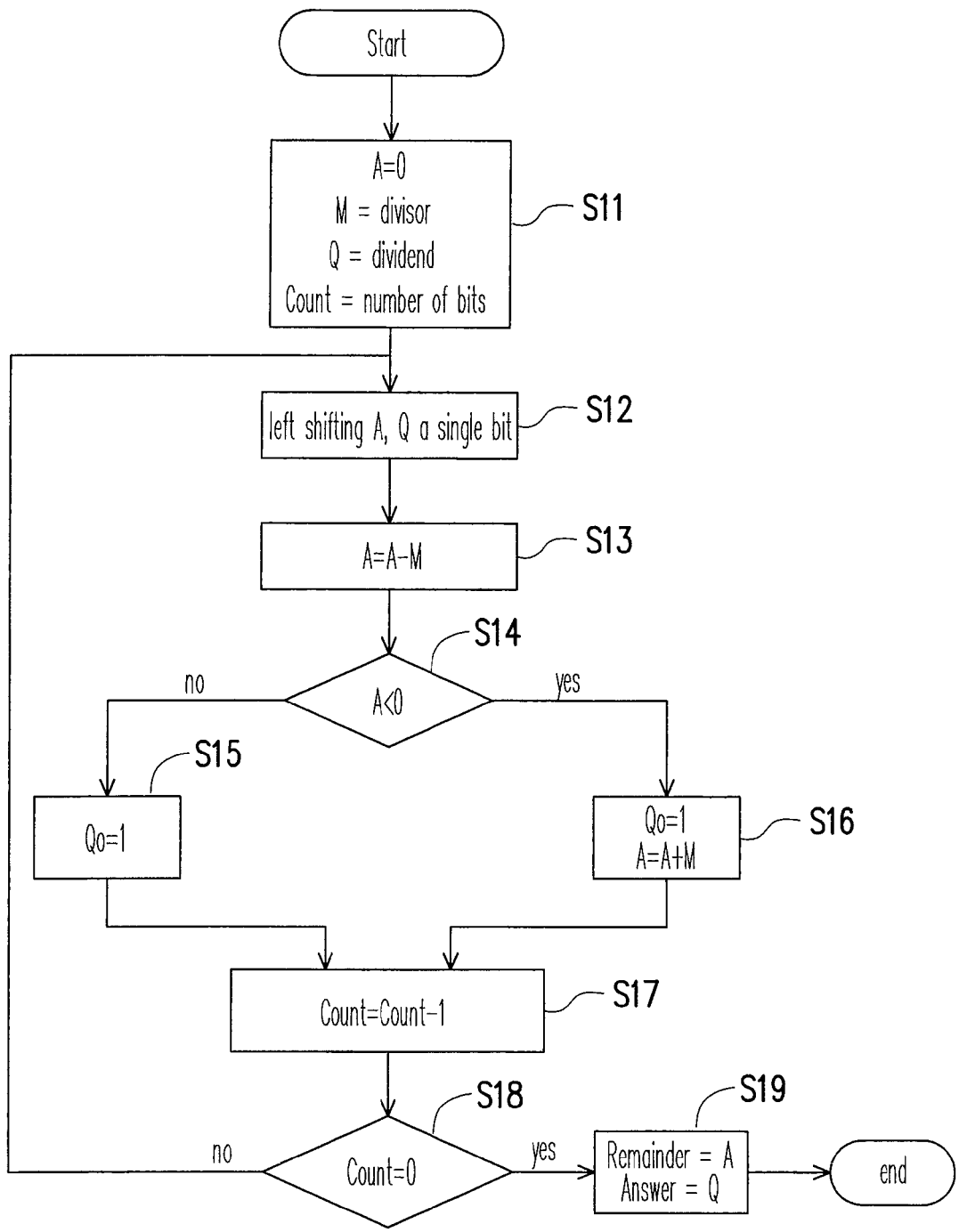
FIG. 1 is a flow diagram showing the steps for performing a conventional shift division.
Figure 2:
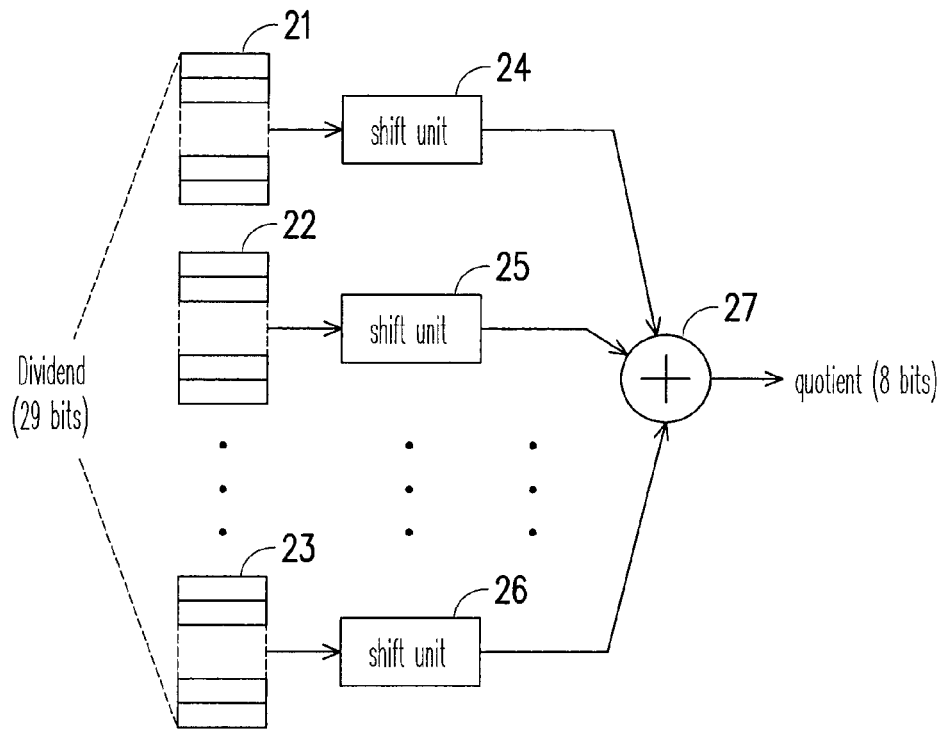
FIG. 2 is a diagram of a division circuit deploying a conventional look-up table.

Reference will now be made in detail to the present preferred embodiments of the invention, examples of which are illustrated in the accompanying drawings. Wherever possible, the same reference numbers are used in the drawings and the description to refer to the same or like parts.

In one embodiment of the present invention, a combinatorial circuit comprising a shift adder and a multiplexer is used to obtain an overall average gray scale value. The overall average gray scale value thus obtained can be used in image analysis for improving the display quality of the image. Compared with the conventional shift division method, the present embodiment only requires a consideration of the net delay, which is considerably smaller than the time needed to perform a shift division, so that some computational time is saved. In a combinatorial logic circuit, shifting involves only a simple and fast wiring connection that demands very little circuit area. Thus, compared with a look-up table method, the present embodiment requires very little additional circuit area.

If the number 1152000 is represented as a base 2 index, it is obtained:

$$\text{Log}_2 1152000 \approx 20.1357 \tag{6}$$

The formula (6) can be rearranged into:

$$1152000 \approx 2^{20} * 20.1357 \approx 2^{20} * 1.09863 \tag{7}$$

After putting formula (7) into formula (5), it is obtained:

$$\text{AVG\_L} = \text{TOTAL\_L}/(220 * 1.09863) \tag{8}$$

$$= \text{TOTAL\_L} * 0.9102/2^{20}$$

In formula (8), the purpose of putting a $2^{20}$ in the denominator is to facilitate hardware implementation. The division by $2^{20}$ represents shifting the dividend right by 20 bits. Thus, in formula (8), the required result is obtained after designing a simple circuit to process the number 0.9102.

Through a simple numerical analysis of the number 0.9102, it is obtained:

$$0.9102 \approx 0.5 + 0.25 + 0.125 + 0.03125 + 0.00390625 \approx \quad (9)$$
$$2^{-1} + 2^{-2} + 2^{-3} + 2^{-5} + 2^{-8}$$

After putting formula (9) into formula (8), it is obtained:

$$AVG\_L = (TOTAL\_L * (2^{-1} + 2^{-2} + 2^{-3} + 2^{-5} + 2^{-8})) * 2^{-20} \quad (10)$$
$$= \begin{pmatrix} TOTAL\_L * 2^{-1} + TOTAL\_L * 2^{-2} + \\ TOTAL\_L * 2^{-3} + TOTAL\_L * 2^{-5} + \\ TOTAL\_L * 2^{-8} \end{pmatrix} * 2^{-20}$$

Formula 10 represents shifting the totaled gray scale signal (TOTAL_L) 1, 2, 3, 5 and 8 bits respectively and then summing them together. Thereafter, the value is shifted 20 bits to obtain the overall average gray scale value AVG_L. In formula 10, the reason for not shifting 20 bits first is that the present embodiment does not use a floating-point computation function. If the 20-bit shift is performed first, the decimal portion may appear too early, leading to an inaccurate calculation.

Figure 3:
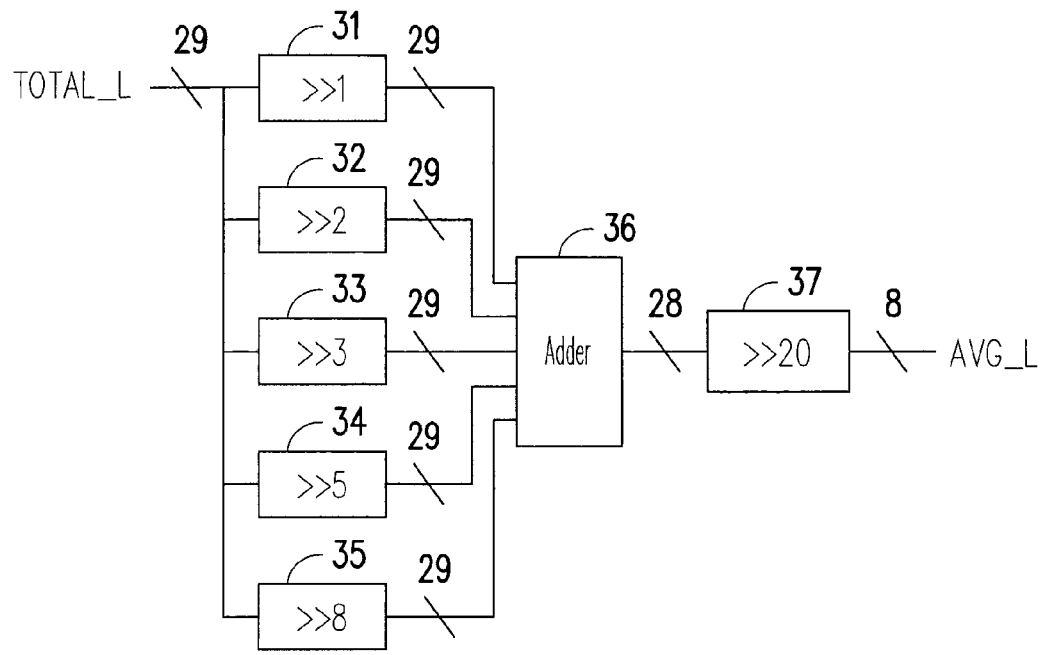
FIG. 3 is a block diagram of a division circuit according to the first embodiment of the present invention.

According to formula (10), FIG. 3 is a block diagram of a division circuit according to the first embodiment of the present invention. As shown in FIG. 3, the circuit in the first embodiment includes a plurality of shift units 31 to 35, an adder 36 and a most-significant-bit (MSB) shift unit 37.

In the present embodiment, the totaled gray scale signal TOTAL_L has 29 bits altogether and the overall average gray scale value AVG_L has 8 bits. The shift units 31 to 35 are used to shift 1 bit, 2 bits, 3 bits, 5 bits and 8 bits of the totaled gray scale signal TOTAL_L respectively. Since the shift units 31 to 35 only perform a shifting operation, the output signal still contains 29 bits.

The adder 36 adds the output signals from the shift units 31 to 35 together. Because the $29^{th}$ bit of the addition result by the adder 36 is supposed to be as 0, only last 28 bits of the addition result are output from the adder 36. Then, the MSB shift unit 37 shifts the output signal (28 bits) of the adder 36 by 20 bits and extracts the 8 bits to serve as the overall average gray scale value AVG_L.

Through the structure shown in FIG. 3, only a plurality of shift units and an adder are required to obtain the overall average gray scale value AVG_L. Therefore, in the first embodiment, the overall average gray scale value AVG_L can be obtained without too much computational time or circuit area.

In an actual circuit design, a shifting operation is only a wiring action. To perform a 1-bit shift, all one has to do is to shift the trailing bit of the input signal to the right a wiring bit and then adds a logic '0' to complete a 1-bit right shift. The concept of shifting other bits is quite similar. Therefore, the present invention also provides a second embodiment whose circuit diagram is shown in FIG. 4.

Figure 4:
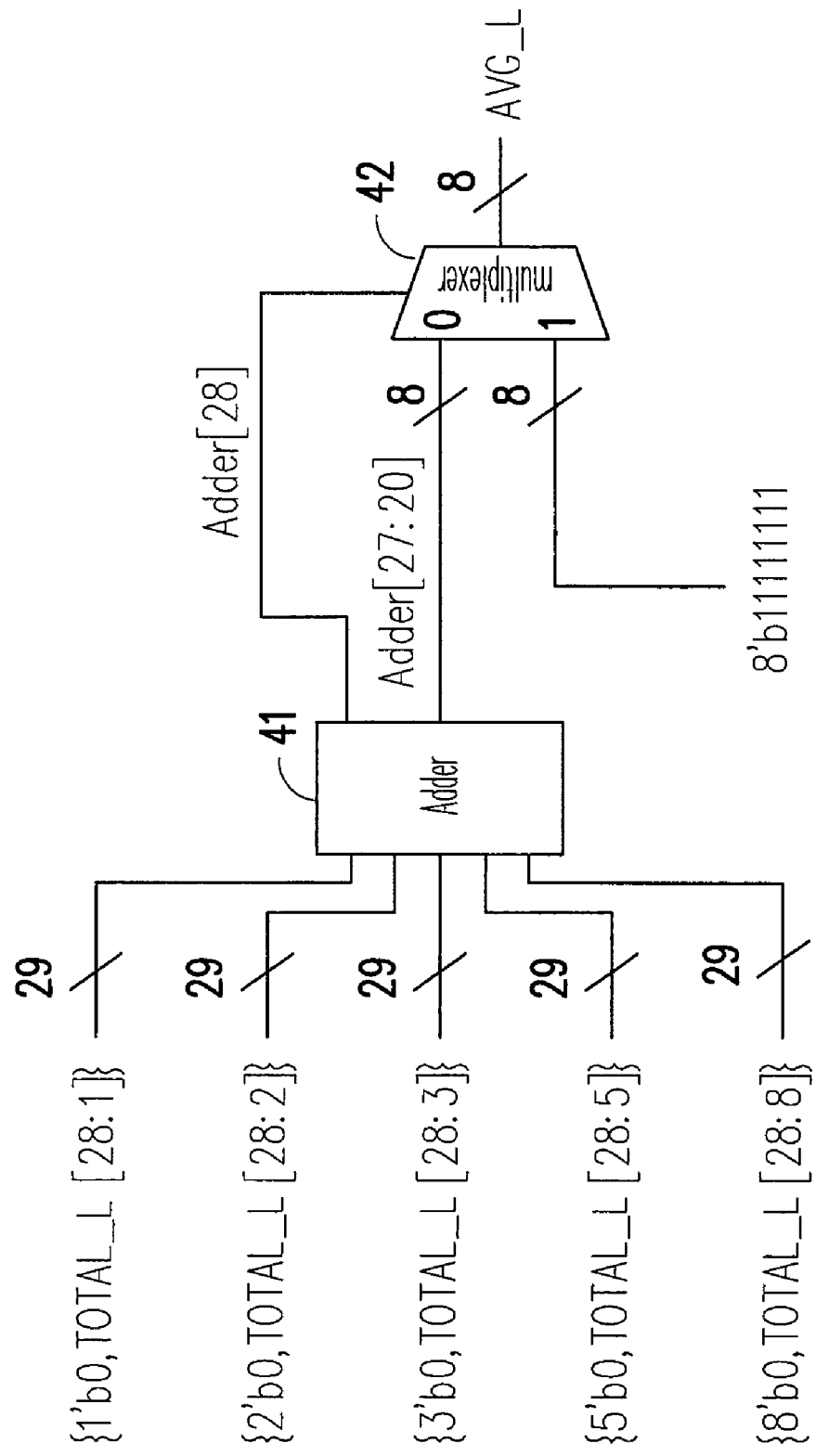
FIG. 4 is a block diagram of a division circuit according to the second embodiment of the present invention.

In FIG. 4, the bus line signal {1'b0,TOTAL_L[28:1]} indicates that, of the 29 bit bus lines of the totaled gray scale signal TOTAL_L, the first bit is 0 and the following 28 bits are the first bus line to the $28^{th}$ bus line of the bus lines of the totaled gray scale signal TOTAL_L. That is, the bus line signal {1'b0,TOTAL_L[28:1]} represents shifting the TOTAL_L to the right one bit and then adding a 0 to the first bit as compensation. The bus line signals {2'b0,TOTAL_L[28:2]}, {3'b0,TOTAL_L[28:3]}, {5'b0,TOTAL_L[28:5]} and {8'b0,TOTAL_L[28:8]} have a similar meaning. After passing the five bus line signals {1'b0,TOTAL_L[28:1]}, {2'b0,TOTAL_L[28:2]}, {3'b0,TOTAL_L[28:3]}, {5'b0,TOTAL_L[28:5]}and {8'b0,TOTAL_L[28:8]} through an adder 41, the adder 41 outputs a 29-bit output result Adder[28:0].

However, in the present embodiment, eight bits Adder[27:20] of the output result Adder[28:0] are input to a multiplexer 42. Moreover, the most significant bit Adder[28] of the output result Adder[28:0] serves as a control signal to the multiplexer 42. The reason for this is to prevent any interference (for example, noise) during the computation process from causing the adder 41 to overflow. Thus, the $29^{th}$ bit Adder[28], with the possibility of triggering an overflow, is treated as a control bit for the multiplexer 42. If the Adder[28] has a bit value '0', there is no overflow and the output bits Adder[27:20] from the adder 41 are the required overall average gray scale value AVG_L. On the other hand, if the Adder[28] has a bit value '1', an overflow has occurred and the multiplexer 42 will select eight bits of 1 (8b'11111111) to serve as the overall average gray scale value AVG_L. That means the overall average gray scale value AVG_L is 255 (the highest value).

The application of the first and the second embodiments is not limited to a resolution of 1152000. They can also be applied to systems having other resolutions as long as the formulas (6) to (10), the amount of shifting in various shift units and the method of generating the bus signals are suitably adjusted.

Figure 5:
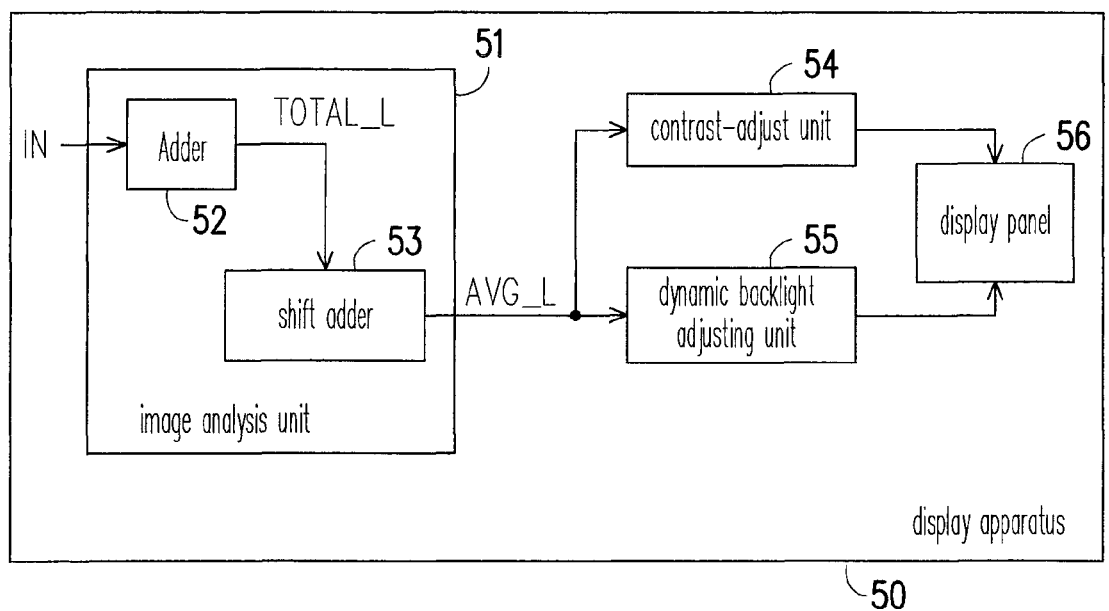
FIG. 5 is a block diagram of a division circuit according to the third embodiment of the present invention.

FIG. 5 is a block diagram of a division circuit according to the third embodiment of the present invention. As shown in FIG. 5, the display apparatus 50 includes at least an image analysis unit 51, a contrast-adjust unit 54, a dynamic backlight adjusting unit 55 and a display panel 56. The image analysis unit 51 further includes an adder 52 and a shift adder 53.

The image analysis unit 51 obtains the overall average gray scale value AVG_L based on the gray scale signal IN. The adder 52 adds up all the gray scale signals of the image together to obtain a totaled gray scale signal TOTAL_L. The shift adder 53 receives the totaled gray scale signal TOTAL_L and outputs an overall average gray scale value AVG_L accordingly. The shift adder 53 can have a structure based on the first or the second embodiment of the present invention.

The overall average gray scale value AVG_L output from the image analysis unit 51 is input to the contrast-adjust unit 54 and the dynamic backlight adjusting unit 55. According to the overall average gray scale value AVG_L, the contrast-adjust unit 54 and the dynamic backlight adjusting unit 55 adjust images on the display panel 56 to improve the display quality.

Therefore, by using a high speed and small circuit area shift adder 53 in the third embodiment, the display apparatus 50 can compute the overall average gray scale value AVG_L within a very short time and use the value to perform an image analysis for improving the display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A division unit for dividing an input signal with M bits (where M is a positive whole number), comprising:
   an adder for receiving a first to an $N^{th}$ bus signals to produce an addition result, wherein the first to the $N^{th}$ bus signals shift the input signal by a different number of bits and adding logic zeros to the shifted bits as compensation, where N is a positive whole number; and
   a multiplexer for receiving a most significant bit (MSB) of the addition result, wherein, when the MSB has a first value, the multiplexer treats P bits of the addition result as a division result, and when the MSB has a second value, the multiplexer outputs P logic 1 to serve as the division result, where P is a positive whole number.

2. The division unit of claim 1, wherein, when the input signal has 29 bits (M=29) and the division unit divides the input signal by 1152000, then N=5 and P=8, and the first to the $N^{th}$ bus signals are the result obtained after performing a 1-bit, a 2-bits, a 3-bits, a 5-bits and an 8-bits shifting operation of the input signal respectively.

3. The division unit of claim 2, wherein the addition result of the adder has 29 bits.

4. The division unit of claim 3, wherein the MSB of the addition result is the $29^{th}$ bit, the first value of the MSB is logic '0' and the second value of the MSB is logic '1'.

5. The division unit of claim 4, wherein, when the MSB is logic '0', the division result is the $28^{th}$ bit to the $21^{st}$ bit of the addition result.

6. An image analysis unit for a display apparatus, comprising:
   an adder for receiving all gray scale signals of an image and producing a totaled gray scale signal; and
   a shift adder for receiving the totaled gray scale signal of the adder, simultaneously and paralleled shifting the totaled gray scale signal by a different number of bits, adding the shifted totaled gray scale signals together and extracting predetermined bits of the addition result to serve as an overall average gray scale signal of the image, wherein the overall average gray scale signal is used for image analysis, and the shift adder comprises:
      an adder for receiving a first to an $N^{th}$ bus signals and producing an addition result, wherein the first to the $N^{th}$ bus signals shift the M-bits totaled gray scale signal by a different number of bits and add logic '0' to the shifted bits as compensation, where N is a positive whole number; and
      a multiplexer for receiving a most significant bit (MSB) of the addition result of the adder, wherein, when the MSB is logic '0', the multiplexer treats P bits of the addition result as the overall average gray scale signal, and when the MSB is logic '1', the multiplexer outputs a plurality of logic 1' to serve as the overall average gray scale signal, where P is a positive whole number.

7. A display apparatus, comprising:
   an image analysis unit for receiving all gray scale signals of an image to produce a totaled gray scale signal, simultaneously performing a shifting of the totaled gray scale signal by a different number of bits, adding up the shifted totaled gray scale signals and extracting predetermined bits of the addition result to serve as an overall average gray scale signal of the image, wherein the image analysis unit comprises:
      an adder for receiving all gray scale signals of the image to produce a totaled gray scale signal; and
      a shift adder for simultaneously shifting the totaled gray scale signal by a different number of bits, adding up the shifted totaled gray scale signals and extracting predetermined bits of the addition result to serve as an overall average gray scale signal of the image, wherein the shift adder comprises:
         an adder for receiving a first to an $N^{th}$ bus signals to produce an addition result, wherein the first to the $N^{th}$ bus signals shift the M-bits totaled gray scale signal by a different number of bits and adding logic '0' to the shifted bits as compensation, where N is a positive whole number; and
         a multiplexer for receiving a most significant bit (MSB) of the addition result of the adder, wherein, when the MSB is logic '0', the multiplexer treats P bits of the addition result as the overall average gray scale signal, and when the MSB is logic '1', the multiplexer outputs a plurality of logic '1' to serve as the overall average gray scale signal, where P is a positive whole number;
   an image-quality adjusting unit for receiving the overall average gray scale signal produced by the image analysis unit; and
   a panel for displaying the image, wherein the image-quality adjust unit adjusts the image displayed on the panel according to the overall average gray scale signal.

8. The display apparatus of claim 7, wherein the image-quality adjusting unit comprises a contrast-adjust unit, or a dynamic backlight adjusting unit, or a combination of the two.

* * * * *